(12) United States Patent
Hayakawa et al.

(10) Patent No.: US 6,179,098 B1
(45) Date of Patent: Jan. 30, 2001

(54) VEHICULAR DAMPER WITH VEHICLE HEIGHT ADJUSTING FUNCTION HAVING AN INTERNAL HEAT SOURCE

(75) Inventors: Yukio Hayakawa; Kiyoshi Nakahara, both of Tochigi-ken (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/274,770

(22) Filed: Mar. 24, 1999

(30) Foreign Application Priority Data

Apr. 24, 1998 (JP) .................................................. 10-115550

(51) Int. Cl.$^7$ ....................................................... F16F 9/42
(52) U.S. Cl. .............................................................. 188/274
(58) Field of Search ................................ 188/274, 322.12, 188/322.19, 322.15, 276; 267/64.11, 64.12, 64.13; 91/42; 92/171.1; 165/104.14, 104.21, 104.24, 104.27, 141, 154, 47

(56) References Cited

U.S. PATENT DOCUMENTS 4,616,810 * 10/1986 Richardson ........................... 188/274

FOREIGN PATENT DOCUMENTS

650974 * 9/1979 (SU) .

* cited by examiner

Primary Examiner—Christopher P. Schwartz
Assistant Examiner—C. Bartz
(74) Attorney, Agent, or Firm—Armstrong, Westerman, Hattori, McLeland & Naughton

(57) ABSTRACT

In a vehicular damper with a vehicle height adjusting function, a pressure source for adjusting the vehicle height is integrally assembled into the damper to improve the ease with which the damper is assembled into a vehicle body. For that purpose, on an outer peripheral portion of a damper main body there is provided a case which is connected to a damper rod and which is vertically movable. A refrigerant which varies between a gaseous phase and a liquid phase is contained in the case in a hermetically sealed manner. An electric heater is disposed inside the case to heat and evaporate the refrigerant by the electric heater. The vehicle height is increased by an increase in the vapor pressure inside the case.

4 Claims, 1 Drawing Sheet

VEHICULAR DAMPER WITH VEHICLE HEIGHT ADJUSTING FUNCTION HAVING AN INTERNAL HEAT SOURCE

BACKGROUND OF THE INVENTION

1. Field of the Invention

The present invention relates to a vehicular damper with a vehicle height adjusting function which is applied to a vehicle such as a motor vehicle. In this specification, the term "vehicular damper" means a damper for use in a vehicle.

2. Description of the Related Art

A vehicle damper is provided with a damper main body, and a damper rod which is inserted into the damper main body so as to be movable up and down. One of the damper main body and the damper rod is connected to an unsprung member, and the other thereof is connected to a vehicle body so that a damping force against the vibrations of the unsprung member can be obtained.

In case a function of adjusting the vehicle height (also called a vehicle height adjusting function) is added to the damper, the following arrangement is conventionally employed. Namely, a cylinder for adjusting the vehicle height is interposed between the vehicle body and the damper. A pressure fluid from a pressure source is supplied to the cylinder to thereby adjust the vehicle height.

In the above-described conventional vehicular damper, the pressure source must be attached to the vehicle body in addition to the damper. Further, a piping work becomes necessary between the pressure source and the cylinder which adjusts the vehicle height. As a result, the assembling work of the above-described members to the vehicle body is time-consuming.

In view of the above points, the present invention has an object of providing a vehicular damper in which the pressure source is integrally assembled into the damper to thereby improve the ease with which the damper is assembled to the vehicle body.

SUMMARY OF THE INVENTION

In order to attain the above and other objects, the present invention is a vehicular damper with a vehicle height adjusting function having a damper main body, and a damper rod which is inserted into the damper main body in a vertically movable manner. The damper comprises: a case which is provided on an outside of the damper main body so as to be vertically movable and which is connected to the damper rod, wherein the case contains therein in a hermetically sealed manner a refrigerant which varies between a gaseous phase and a liquid phase; and an electric heater for heating the refrigerant.

When the electric heater is charged with electricity, the refrigerant is heated and evaporated. The case, i.e., the damper rod, is thus pushed by the vapor pressure of the refrigerant and is displaced in the direction of extension, whereby the vehicle height is increased. In this manner, the pressure source of heat-pressure conversion type is constituted by the case in which the refrigerant is filled in a hermetically sealed manner, and the electric heater. Since this pressure source is integrally assembled into the damper, the ease with which the damper is assembled into the vehicle body can be improved.

It is possible to mount the electric heater on an outer peripheral portion of the case. However, if the electric heater is disposed inside a liquid sump portion in which the refrigerant in liquid phase is accumulated, the refrigerant can be efficiently heated as a result of heat transfer with boiling. It is thus possible to advantageously increase the vapor pressure inside the case, i.e., the vehicle height, with a good response.

If a cooling fin is disposed on that outer peripheral portion of the case which lies above the portion in which the electric heater is disposed, it is advantageous in the following point. Namely, when the electric charging to the electric heater is stopped, the remaining heat of the electric heater is rapidly deprived of, or taken away, by the condensation of the gaseous phase refrigerant in the portion in which the cooling fin is disposed and the evaporation of the liquid phase refrigerant which flows down to the portion in which the electric heater is disposed. As a result, the vapor pressure inside the case, i.e., the vehicle height, can be decreased with a good response.

BRIEF DESCRIPTION OF THE DRAWING

The above and other objects and the attendant advantages of the present invention will become readily apparent by reference to the following detailed description when considered in conjunction with the accompanying drawing wherein.

DETAILED DESCRIPTION OF A PREFERRED EMBODIMENT

Figure 1:
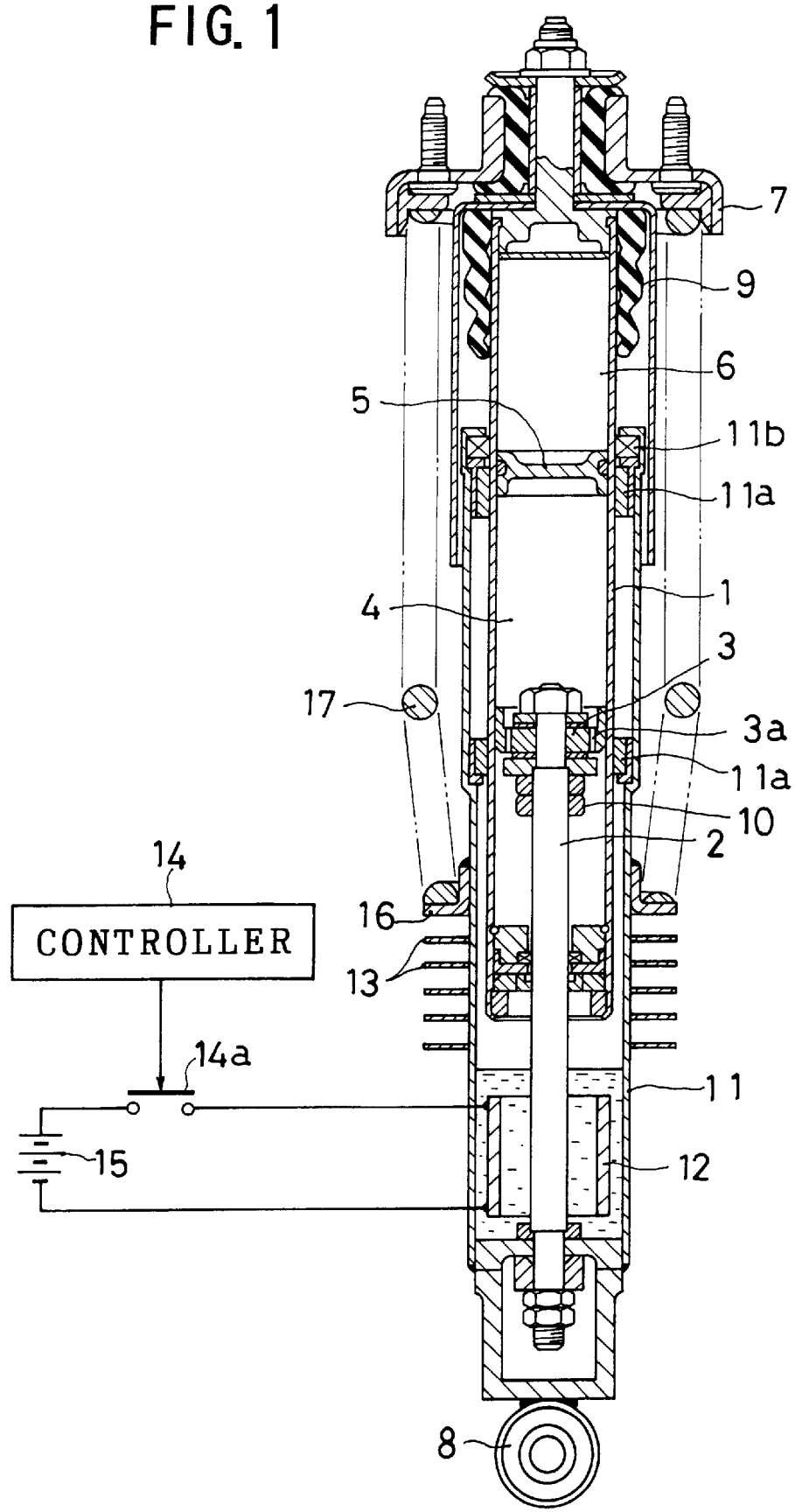
FIG. 1 is a longitudinal sectional view of one example of a damper according to the present invention.

With reference to FIG. 1, reference numeral 1 denotes a damper main body which is made up of a single tube. A damper rod 2 is inserted into the damper main body 1 from the bottom side thereof so as to be movable up and down. On an upper end of the damper rod 2, there is mounted a damper piston 3 having an orifice 3a. The damper main body 1 has formed therein an oil chamber 4 into which the damper piston 3 is inserted, and an upper gas chamber 6 which is partitioned by a free piston 5 relative to the oil chamber 4. As a whole, a mono-tube type of hydraulic damper is thus constituted by the above-described members. The damper main body 1 is connected to a vehicle body via a bracket 7 which is attached to an upper end of the damper main body 1. The damper rod 2 is connected to an unsprung member via a bush 8 which is attached to a lower end of the damper rod 2. It is thus so arranged that a damping force against the vertical vibrations of the unsprung member can be obtained. Further, a bump stop rubber 9 is provided on the lower side of the bracket 7, and a rebound stop rubber 10 is provided on the lower side of the damper piston 3. A stopper function can thus be obtained against the bumping motion (contraction motion) and the rebounding motion (extension motion) of the damper.

On an outside of the damper main body 1 there is provided a case 11 which is vertically movable. The lower end portion of the case 11 is connected to the damper rod 2 in a hermetically sealed manner. The case 11 is in slidable contact with an outer peripheral portion of the damper main body 1 via a pair of guide rings 11a, 11a. On an upper end of the case 11 there is further provided a sealing member 11b which seals the clearance between the damper main body 1 and the case 11, whereby the space inside the case 11 is hermetically sealed. The case 11 contains therein in a hermetically sealed manner a refrigerant of low boiling point such as Freon R134a, R152a, or the like, which has therein a mixture of a lubricating oil and which varies between a gaseous phase and a liquid phase. Inside a liquid sump portion (a portion in which the liquid phase refrigerant is accumulated) at the bottom of the case 11, there is disposed an electric heater 12 in the form of: a winding type heater such as a nichrome wire, sheath heater or the like; a plate type heater; a positive temperature coefficient (PCT) heater, or the like. On that outer peripheral portion of the case 11 which lies above the portion in which the electric heater 12 is disposed, there are provided cooling fins 13. The electric heater 12 is connected to a vehicle-mounted battery 15 via a switch 14a which is controlled by a controller 14. Further, on that outer peripheral portion of the case 11 which lies above the cooling fins 13, there is mounted a spring receiving member 16. A suspension spring 17 is thus disposed between the spring receiving member 16 and the bracket 7.

In the above-described arrangement, when the electric heater 12 is charged with electricity, the liquid phase refrigerant which is accumulated in the lower portion of the case 11 is heated and evaporated, and the vapor pressure inside the case 11 increases. As a consequence, the damper rod 2 is pushed down by the vapor pressure relative to the damper main body 1, whereby the vehicle height increases. Particularly, in this embodiment, since the electric heater 12 is disposed inside the liquid sump portion at the bottom of the case 11, the refrigerant is efficiently heated as a result of heat transfer with boiling. The vapor pressure inside the case 11, i.e., the vehicle height, can thus be increased with a good response. When the electric charging to the electric heater 12 is stopped, there will occur a repetition of condensation of the gaseous phase refrigerant in the portion in which the cooling fins 13 are disposed and evaporation of the liquid phase refrigerant which has flown down to the portion in which the electric heater 12 is disposed. The remaining heat of the electric heater 12 is rapidly deprived of, or taken away, and the vapor pressure inside the case 11, i.e., the vehicle height, is decreased with a good response. In this manner, the vehicle height can be adjusted with a good response by controlling the electric charging to the electric heater 12 by an input of a signal from a vehicle height sensor (not illustrated) into the controller 14.

An explanation has so far been made about an embodiment which is applied to a mono-tube type of hydraulic damper. However, the present invention can also be applied to a multi-tube type of hydraulic damper, as well as to those dampers such as a friction damper, or the like which are other than a hydraulic damper.

As is apparent from the above explanations, according to the present invention, the pressure source for adjusting the vehicle height can be integrally assembled into the damper. Therefore, the ease with which the damper is assembled can be improved.

It is readily apparent that the above-described vehicular damper with a vehicle height adjusting function meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vehicular damper with a vehicle height adjusting function having a damper main body, and a damper rod which is inserted into the damper main body in a vertically movable manner, said damper comprising:

a case which is provided on an outside of said damper main body so as to be vertically movable and which is connected to said damper rod, wherein said case contains therein in a hermetically sealed manner a refrigerant which varies between a gaseous phase and a liquid phase; and an electric heater, disposed within said case, for heating the refrigerant.

2. A damper according to claim 1, wherein said electric heater is disposed inside a liquid sump portion in which the refrigerant in liquid phase is accumulated.

3. A damper according to 1, further comprising a cooling fin which is disposed on that outer peripheral portion of said case which lies above a portion in which said electric heater is disposed.

4. A damper according to 2, further comprising a cooling fin which is disposed on that outer peripheral portion of said case which lies above a portion in which said electric heater is disposed.

* * * * *